US011585349B2

(12) United States Patent
Klingler et al.

(10) Patent No.: US 11,585,349 B2
(45) Date of Patent: Feb. 21, 2023

(54) BLOWER UNIT FOR A HANDHELD BLOWER APPARATUS

(71) Applicant: Andreas Stihl AG & Co. KG, Waiblingen (DE)

(72) Inventors: Simon Klingler, Stuttgart (DE); Thilo Stuerzel, Remshalden (DE); Cornelius Gindele, Plochingen (DE); Markus Zauner, Fellbach (DE); Silke Kaminski, Waiblingen (DE); Ulrich Siller, Bornheim (DE); Georg Kroeger, Cologne (DE); Christian Barth, Korb (DE); Johannes Menzel, Wernau am Neckar (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 424 days.

(21) Appl. No.: 16/740,122

(22) Filed: Jan. 10, 2020

(65) Prior Publication Data
US 2020/0221651 A1    Jul. 16, 2020

(30) Foreign Application Priority Data
Jan. 15, 2019    (EP) ..................................... 19151913

(51) Int. Cl.
*F04D 25/08*    (2006.01)
*A01G 20/47*    (2018.01)
(Continued)

(52) U.S. Cl.
CPC ........... *F04D 25/084* (2013.01); *A01G 20/47* (2018.02); *F04D 19/002* (2013.01); *F04D 29/541* (2013.01); *E01H 1/0809* (2013.01)

(58) Field of Classification Search
CPC .... F04D 19/002; F04D 19/007; F04D 25/084; F04D 29/541; F04D 29/545; F04D 29/664; A01G 20/47
See application file for complete search history.

(56) References Cited

U.S. PATENT DOCUMENTS

2014/0234130 A1\* 8/2014 Yamaoka ............ F04D 25/0673
417/234
2016/0169249 A1\* 6/2016 Takahashi ........... F04D 25/0673
417/423.14
(Continued)

FOREIGN PATENT DOCUMENTS

CN            206815252 U     12/2017

*Primary Examiner* — Kenneth J Hansen
(74) *Attorney, Agent, or Firm* — Walter Ottesen, P.A.

(57) ABSTRACT

A blower unit for a portable handheld blower apparatus has a housing section and a tubular receiving space, formed in the housing section, with a first axial end and a second axial end and with a longitudinal center axis. Arranged in the receiving space of the housing section is an axial blower for generating a blower air flow, the axial blower being driven by a drive motor. The receiving space has an intake opening at its first axial end and a discharge opening at its second axial end. In order to reduce operating noise, an air guide plate is arranged at an axial distance in front of the intake opening, the air guide plate having external dimensions that are greater than the external dimensions of the intake opening. An annular gap that supplies intake air is formed between the air guide plate and an outer periphery of the housing section.

23 Claims, 6 Drawing Sheets

(51) Int. Cl.
  *F04D 19/00* (2006.01)
  *F04D 29/54* (2006.01)
  *E01H 1/08* (2006.01)

(56) References Cited

U.S. PATENT DOCUMENTS

2016/0298635 A1   10/2016  Su et al.
2018/0163750 A1    6/2018  Landen et al.
2019/0154058 A1*  5/2019  Sergyeyenko ........ F04D 29/164

* cited by examiner

FIG. 6

BLOWER UNIT FOR A HANDHELD BLOWER APPARATUS

CROSS REFERENCE TO RELATED APPLICATION

This application claims priority of European patent application no. 19 151 913.1, filed Jan. 15, 2019, the entire content of which is incorporated herein by reference.

FIELD OF THE INVENTION

A blower unit for a portable, handheld blower apparatus has a housing section and a tubular receiving space formed in the housing section. The receiving space has a first axial end and a second axial end, and a longitudinal center axis. An axial blower for generating a blower air flow is arranged in the receiving space of the housing section and is driven by a drive motor. The central blower hub of the axial blower is aligned with the longitudinal center axis of the receiving space, the receiving space having an intake opening at its first axial end and a discharge opening at its second axial end.

BACKGROUND OF THE INVENTION

If the drive motor is in the form of an electric drive motor, the operating noise of the blower unit is lower compared with an axial blower driven by a combustion engine. During operation of an axial blower, the axial blower itself brings about noise excitation, which escapes axially via the intake opening and causes noise pollution for the environment.

SUMMARY OF THE INVENTION

It is an object of the invention to provide a blower unit with an axial blower for a portable, handheld work apparatus configured such that the operating noise of the blower unit is reduced.

This object can, for example, be achieved for a blower unit in that an air guide plate is arranged at an axial distance in front of the intake opening, the air guide plate having external dimensions that are greater than the external dimensions of the intake opening. As a result, the intake opening of the axial blower is covered, and so axial sound wave emergence is prevented. The air guide plate arranged in front of the intake opening in the direction of flow of the intake air results in a gap that supplies intake air being formed between the air guide plate and the outer periphery of the housing section. The gap can also be referred to as an air gap for the inflowing intake air.

Since the external dimensions of the air guide plate are greater than the external dimensions of the intake opening, the entering intake air has to be deflected through a deflection angle of at least 90°. The noise emissions of the axial blower are reflected in the direction of the receiving space by the air guide plate and can only partially emerge via the annular gap. As a result, a significant noise reduction of the operating noise of the blower unit can be achieved.

As a result of the arrangement of the in particular air-impermeable air guide plate in front of the intake opening, the gap that supplies intake air extends over a circumferential angle of up to 360° about the longitudinal center axis of the receiving space and/or of the housing section. As a result, a large air intake surface can be provided, with the result that the intake noise brought about by the inflowing intake air is reduced.

The intake air entering via the gap is supplied to the intake opening of the receiving space or to the axial blower through a deflection angle of more than 90°, in particular through a deflection angle of up to 180°.

In an embodiment, the intake opening is in the form of a circular area with a radial outer diameter. The air guide plate has a radial outer diameter that is greater than the radial outer diameter of the intake opening. The gap that supplies the intake air is preferably in the form of an annular gap.

In an embodiment, the air guide plate has an air guide cone on its plate side facing the intake opening. The air guide cone is fixed to the air guide plate, and preferably formed integrally with the air guide plate. The air guide plate and the air guide cone consist in particular of plastic.

The gap that supplies intake air and is located between the air guide plate and the housing section of the blower unit is developed in particular as an air supply channel. The air supply channel is delimited by the air guide cone of the air guide plate on one side and by the peripheral wall of the housing section on the other side. The air supply channel therefore extends axially to the intake opening of the receiving space over the distance of the air guide plate in front of the intake opening. In particular, the air guide channel extends through 360° in the circumferential direction about the longitudinal center axis of the receiving space. As a result, a large air intake surface can be achieved, resulting in a reduction in intake noise.

The air supply channel is formed with a deflection angle of more than 90°. In particular, the air supply channel is formed with a deflection angle of 120°, preferably with a deflection angle of up to 180°.

The air guide cone is located centrally with respect to the intake opening and extends in the direction of the intake opening. The air guide cone is arranged coaxially with the longitudinal center axis of the receiving space. A free end section of the air guide cone is located at a distance in front of the blower hub of the axial blower. Preferably, the end face of the end section of the air guide cone is concavely curved and engages over the blower hub of the axial blower in a contact-free manner. The concave end face spans the blower hub in a manner similar to a tent roof.

In an embodiment, the maximum diameter of the end face of the air guide cone is smaller than the maximum outer diameter of the blower hub of the axial blower.

For further noise insulation, it may be advantageous to apply a sound insulating lining to the outer surface of the air guide cone. In particular, the outer surface of the air guide cone bears a foam layer or some other noise insulating coating.

In an embodiment, the gap between the air guide plate and the housing section is covered by a protective grating.

Advantageously, the configuration is embodied such that the air guide plate is held mechanically by the protective grating on the housing section of the blower unit.

The air intake surface of the annular gap faces the housing section or the discharge opening of the receiving space. The air intake surface is in particular inclined with respect to the longitudinal center axis of the receiving space.

The intake opening of the receiving space lies in a plane to which the longitudinal center axis of the receiving space is perpendicular. In an embodiment, the air guide plate is parallel to the plane of the intake opening.

The drive motor of the blower unit is in particular an electric drive motor, which is held in the receiving space together with the axial blower.

The features, advantages and design configurations mentioned in the claims and/or the description can be combined with one another in any way.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
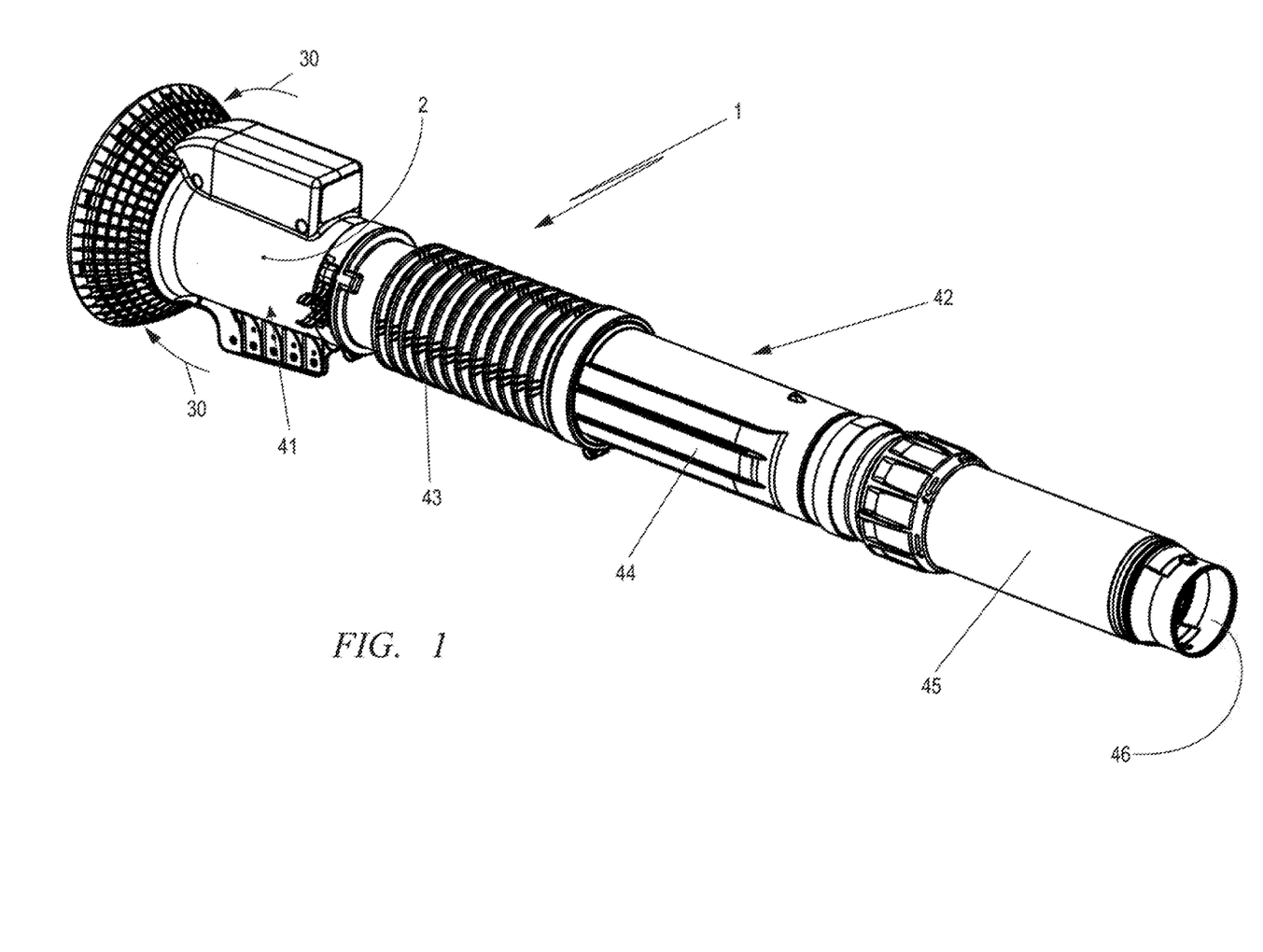
FIG. 1 shows a schematic of the blower unit in side view.

The blower unit 1 shown in FIG. 1 is part of a blower apparatus that is not illustrated in more detail. The blower unit 1 is installed in particular in a portable, handheld work apparatus or is used as a blower unit in other blower apparatuses.

The blower unit 1 has a drive unit 41, which is provided in a housing section 2 of the blower unit 1. The drive unit 41 includes—as is shown in particular in FIG. 3—a drive motor 8, which drives an axial blower 7.

The axial blower 7 draws in intake air 30 from the environment and blows it out via a blower tube 42. The blower tube 42, in the embodiment shown, includes a flexible tube section 43, which is arranged between the drive unit 41 and a rigid intermediate tube section 44. The intermediate tube section 44 opens into an end tube 45, the outlet 46 of which can bear a mouthpiece (not illustrated in more detail), a blower nozzle or the like.

Figure 2:
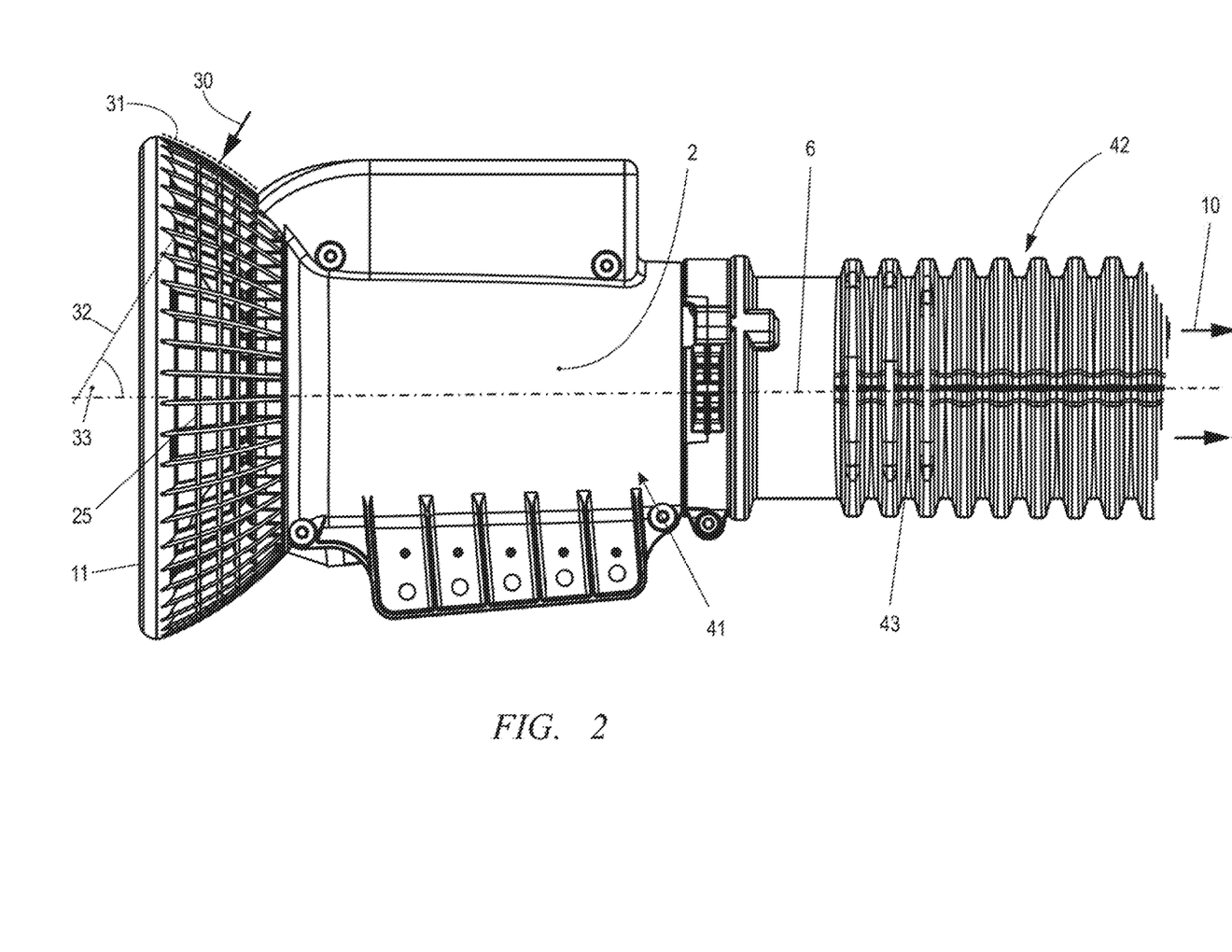
FIG. 2 shows an enlarged illustration in side view of the drive unit of the blower unit with an air guide plate arranged in front of the intake opening of the blower.

It is clear from the enlarged illustration according to FIG. 2 that the intake air 30 is drawn in from an intake direction 32, which forms an acute angle 33 with a longitudinal center axis 6 of the housing section 2. The angle 33 faces an air guide plate 11, which is arranged in front of the housing section 2 in the intake direction of the intake air 30.

Figure 3:
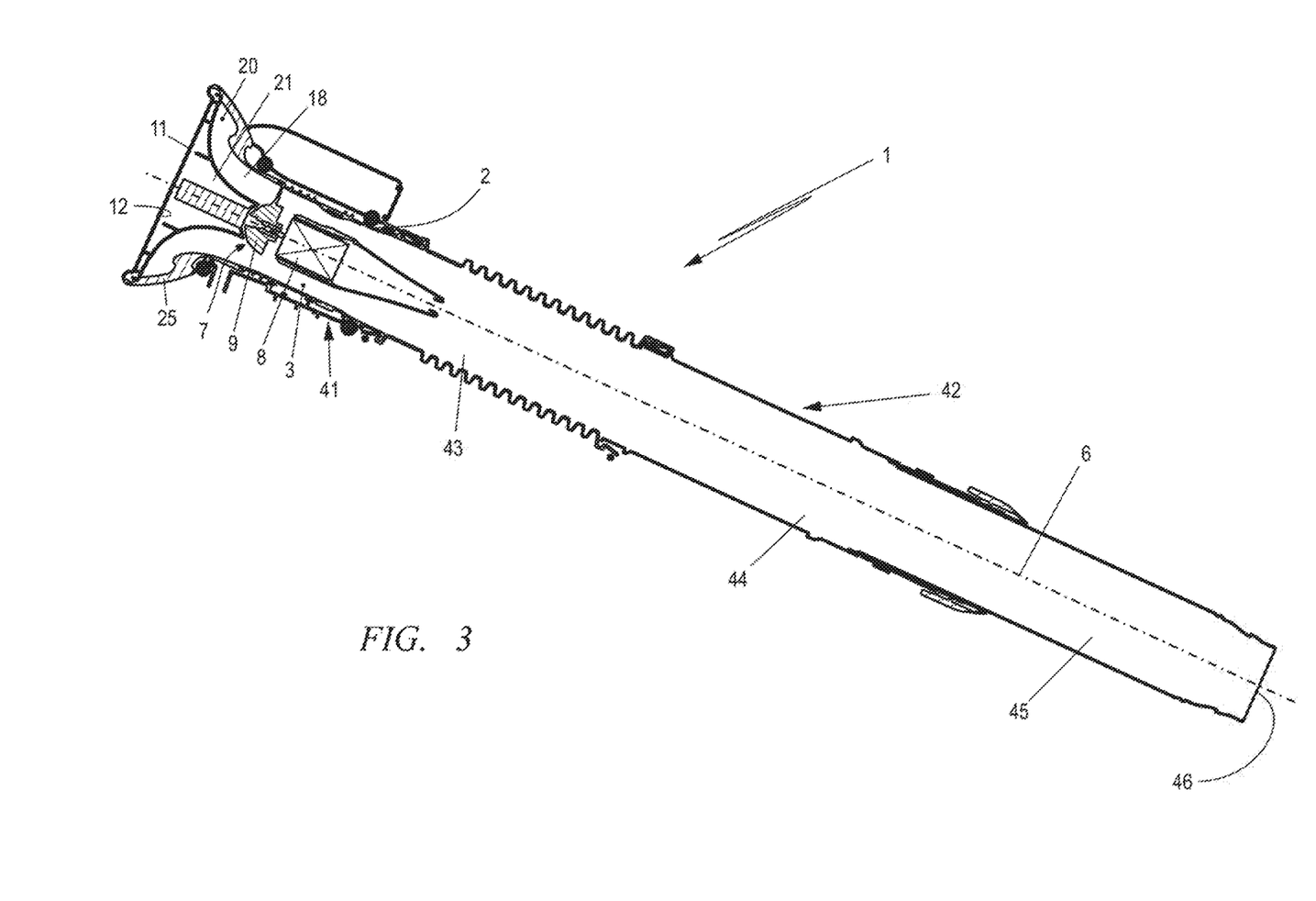
FIG. 3 shows a schematic section through the blower unit according to FIG. 1.
Figure 4:
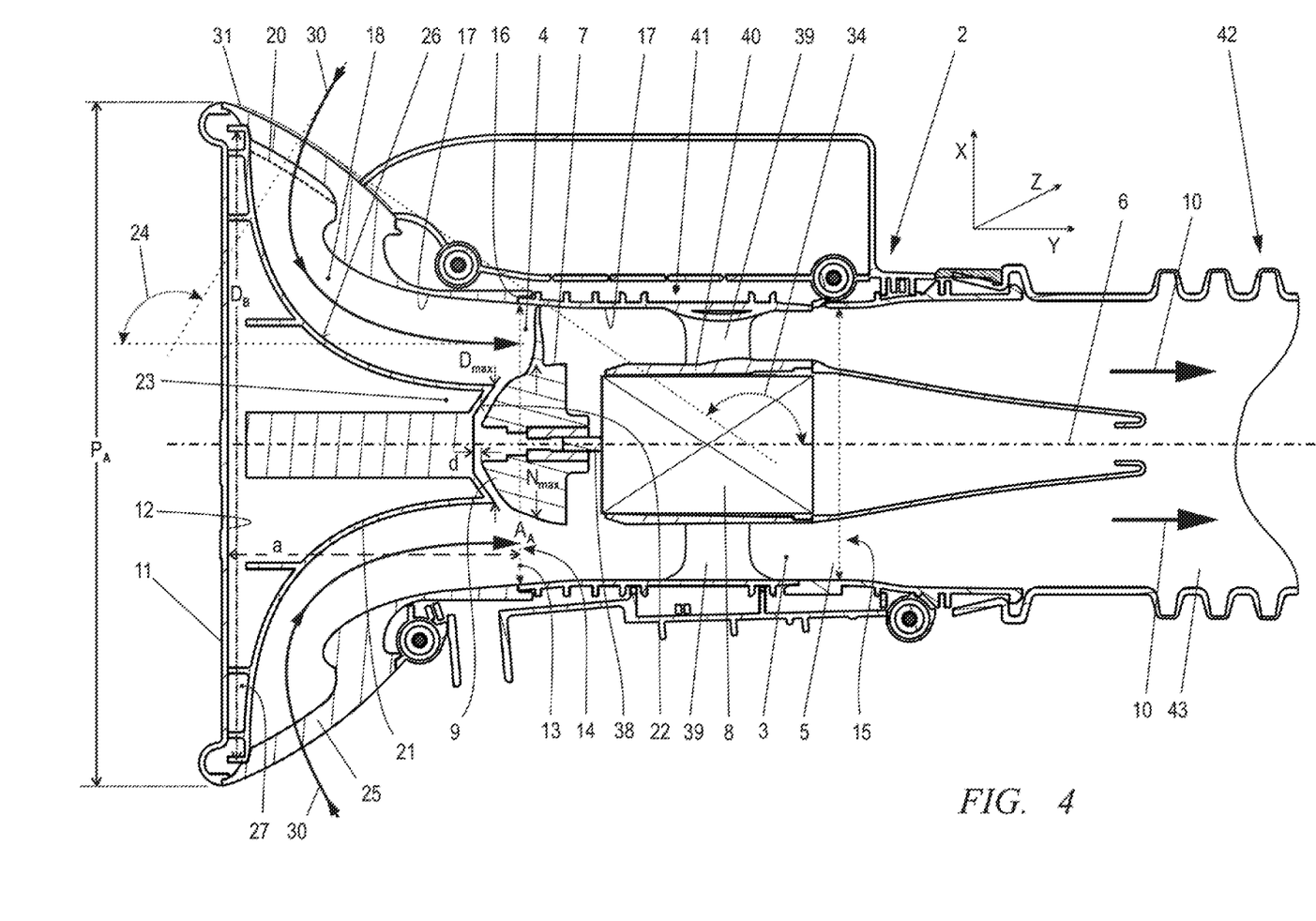
FIG. 4 shows an enlarged illustration of a section through the drive unit, arranged in the blower unit, with an axial blower.

FIG. 3, and in particular the enlarged illustration according to FIG. 4, show the basic structure of the drive unit 41 of the blower unit 1.

Formed in the housing section 2 is an in particular tubular receiving space 3, which has a longitudinal center axis 6. The longitudinal center axis 6 is advantageously at the same time the longitudinal center axis of the housing section 2.

The receiving space 3 has an intake opening 14 at a first axial end 4. The intake opening 14 extends over the height and the width of the receiving space 3. The receiving space 3 is in particular a cylindrical receiving space 3. The intake opening 14 advantageously forms a circular area with a radial outer diameter $A_A$. The receptacle opening 14 in this case defines a plane 13, to which in particular the longitudinal center axis 6 of the receiving space 3 is perpendicular.

The expediently tubular receiving space 3 has a second axial end 5, which forms a discharge opening 15. If the receiving space 3 is formed in a tubular manner, the discharge opening 15 forms a circular area.

The intake opening 14 and the discharge opening 15 are preferably formed in an identical manner. The intake opening 14 has in particular the same cross-sectional area as the discharge opening 15. The discharge opening 15 is preferably parallel to the plane 13 of the intake opening 14. Expediently, the intake opening 14 of the receiving space 3 lies in a plane 13 to which the longitudinal center axis 6 of the receiving space 3 or of the housing section 2 is perpendicular.

Held in the receiving space 3 is a drive motor 8, which drives an axial blower 7. Advantageously, the drive motor 8 is an electric drive motor. In the embodiment shown, the drive motor 8 is held in a collar 40, which is fixed in the receiving space 3 via radial holding struts 39. The arrangement is such that the axis of rotation of the drive motor 8 is coaxial with the longitudinal center axis 6 of the receiving space 3. The blower hub 9 of the axial blower 7 is held on the motor shaft 38 of the drive motor 8 for conjoint rotation. If the axial blower 7 is driven by the drive motor 8, intake air 30 is drawn into the receiving space 3 via the intake opening 14. Via the discharge opening 15, the intake air 30 is blown out into the blower tube 42 as a blower air flow 10.

As FIGS. 3 and 4 show, an air guide plate 11 is located in front of the intake opening 14 of the receiving space 3. The air guide plate 11 is formed in particular in an air-impermeable manner. The air guide plate 11 bears an air guide cone 21 on its plate side 12 facing the intake opening 14. The air guide plate 11 and the air guide cone 21 are advantageously configured as a unitary component. The air guide plate 11 and/or the air guide cone 21 consist preferably of plastic.

The air guide plate 11 is at a distance a in front of the intake opening 14 of the receiving space. The air guide cone 21 projects from the air guide plate 11 in the direction of the intake opening 14 and ends in front of the blower hub 9. In particular, the vertical axis of the air guide cone 21 is coaxial with the longitudinal center axis of the receiving space 3 or of the housing section 2.

The air guide plate 11 has external dimensions that are greater than the external dimensions of the intake opening 14. As seen in the axial direction, the air guide plate 11 completely covers the intake opening 14. The air guide plate 11 advantageously has the same geometric shape as the intake opening 14, but is configured to have a greater area than the intake opening 14. Sound waves generated by the axial blower cannot escape directly axially from the blower unit.

In the embodiment shown, the intake opening 14 of the receiving space 3 is in the form of a circular area with a radial outer diameter $A_A$. The air guide plate 11 has in particular an identical shape, the air guide plate 11 having a radial outer diameter $P_A$ that is greater than the radial outer diameter $A_A$ of the intake opening 14. The air guide plate 11 can also be configured differently than a circular area. The air guide plate 11 is formed with larger external dimensions in the X direction and the Y direction than the intake opening 14, as the view in FIG. 6 also shows. The longitudinal center axis 6 of the housing section 2 forms the Z axis of the assumed coordinate system.

The air guide cone 21 has a base 27, or cone root, the base diameter $D_B$ of which corresponds advantageously to the outer diameter $P_A$ of the air guide plate 11. In the embodiment shown, the base diameter $D_B$ is approximately 1% to 10% smaller, in particular 4% to 8% smaller, than the outer diameter $P_A$ of the air guide plate 11.

The air guide cone 21 ends in an end section 23 with an end face 22. The end face 22 is concavely curved. The end face 22 engages over the facing end of the blower hub 9 in a contact-free manner. In the embodiment shown, the end face 22 is at in particular the same distance d from the blower hub 9 over the area of the end face 22. The distance d is a small distance of expediently 0 mm to 1 mm. The small distance d can advantageously be 0 mm to 5 mm, in particular 1 mm to 25 mm. The longitudinal center axis of the air guide cone 21 expediently lies on the longitudinal center axis 6 of the receiving space 3.

The dimension of the end face 22 is configured such that the maximum diameter $D_{max}$ of the end face 22 is smaller than the maximum hub diameter $N_{max}$. The maximum diameter $D_{max}$ of the end face 22 is in particular 10% to 30%, preferably 20%, smaller than the hub diameter $N_{max}$.

Formed between the air guide plate 11 and the housing section 2 is a gap 20, via which intake air 30 is supplied to the intake opening 14. The structural configuration is such that the intake air 30 entering via the gap 20 is supplied to the intake opening 14 through a deflection angle 24 of more than 90°. Advantageously, the deflection angle 24 is chosen to be up to 180°. In the embodiment shown, the deflection angle of the supplied intake air 30 is provided to be 120°.

The intake air is supplied via the entire circumference of the receptacle opening 14. The gap 20 extends in the circumferential direction of the housing portion 2 through a circumferential angle of up to 360°, preferably 360°, about the longitudinal center axis 6.

The gap 20 formed between the housing section 2 and the air guide plate 11 has an air intake surface 31 that is at an angle 34 to the longitudinal center axis 6. The angle 34 opens toward the discharge opening 15 and is about 145° in the embodiment shown. Preferably, the size of the angle 34 is between 90° and 175°. In an embodiment, the air intake surface 31 is parallel to the longitudinal center axis 6.

In an embodiment, the gap 20 is in the form of an air supply channel 18. The air supply channel 18 extends from an air intake surface 31 at the annular gap 20 axially to the intake opening 14 and through 360° in the circumferential direction about the longitudinal center axis 6.

The air intake surface 31 of the air supply channel 18 is oriented such that the air supply channel 18 has a deflection angle 24 of more than 90° from the air intake surface 31 to the intake opening 14. Advantageously, the air supply channel 18 is formed with a deflection angle of up to 180°. In particular, the air supply channel 18 is formed with a deflection angle of 120°.

Figure 6:
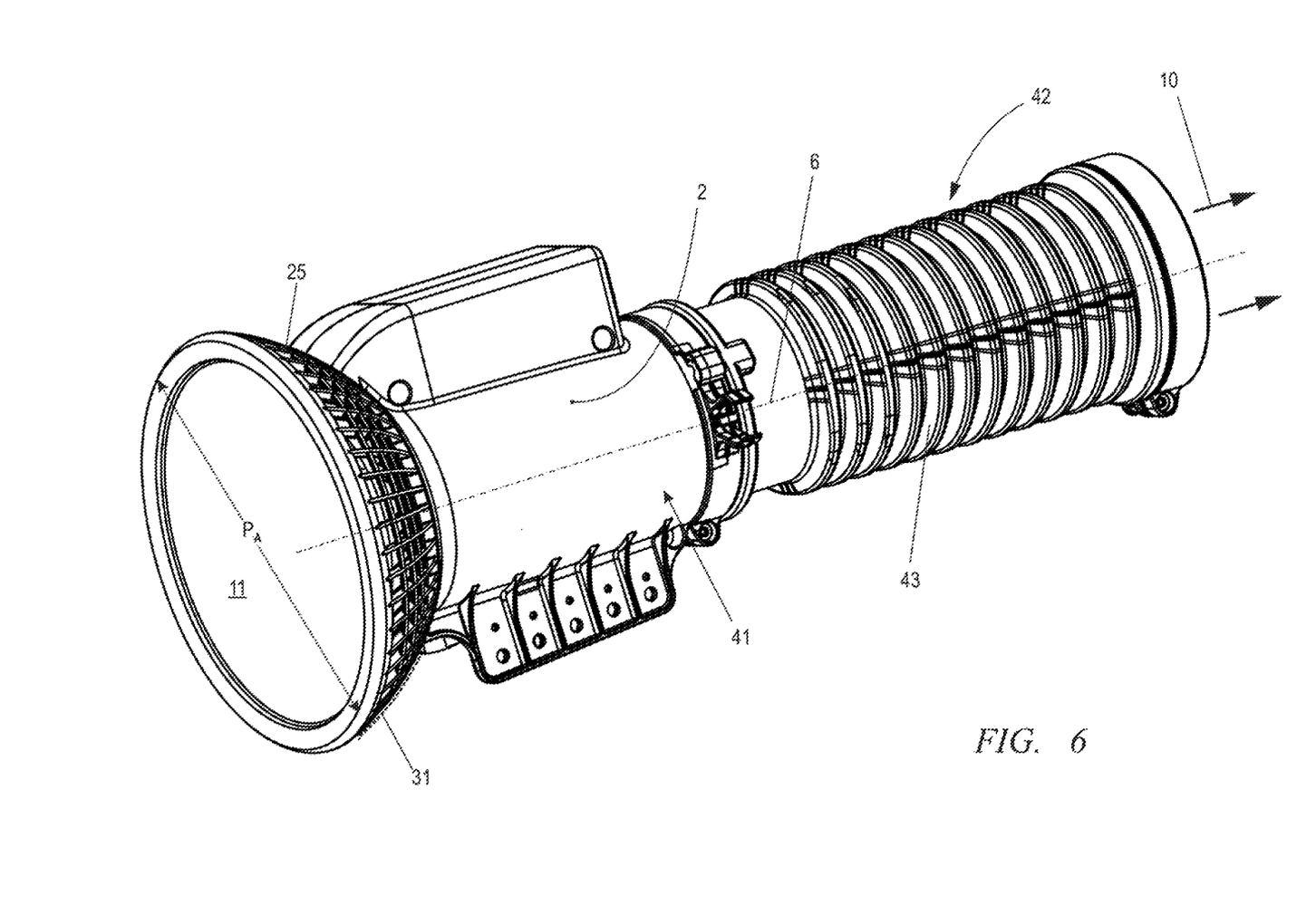

In the embodiment shown, the intake opening 14 of the receiving space 3 is configured as a circular area with a radial outer diameter $A_A$. The air guide plate 11 is likewise configured as a circular area with a radial outer diameter $P_A$, as is also illustrated in FIG. 6. The outer diameter $P_A$ of the air guide plate is greater than the radial outer diameter $A_A$ of the intake opening 14, and so the gap 20 is in the form of an annular gap. The annular gap is developed as an air supply channel 18 and is delimited by the outer surface 26 of the air guide cone 21 on one side and by the peripheral wall 17 of the housing section 2 on the other side. The air supply channel 18 thus extends from an air intake surface 31 at the gap 20 in the form of an annular gap, axially toward the intake opening 14 and extends in the circumferential direction through a circumferential angle of 360° about the longitudinal center axis 6. The air supply channel 18 is configured in particular as a toroidal channel.

In an embodiment, a protective grating 25 that covers the gap 20 is provided between the air guide plate 11 and the housing section 2 of the blower unit 1. The protective grating 25 prevents mechanical engagement in the gap 20. In particular, the air guide plate 11 is mechanically held on the housing section 2 by the protective grating 25 secured to the blower unit 1. The air guide cone 21 projects freely from the air guide plate 11 in the direction of the intake opening 14 and spans the blower hub 9 with its in particular concavely configured end face 22.

Figure 5:
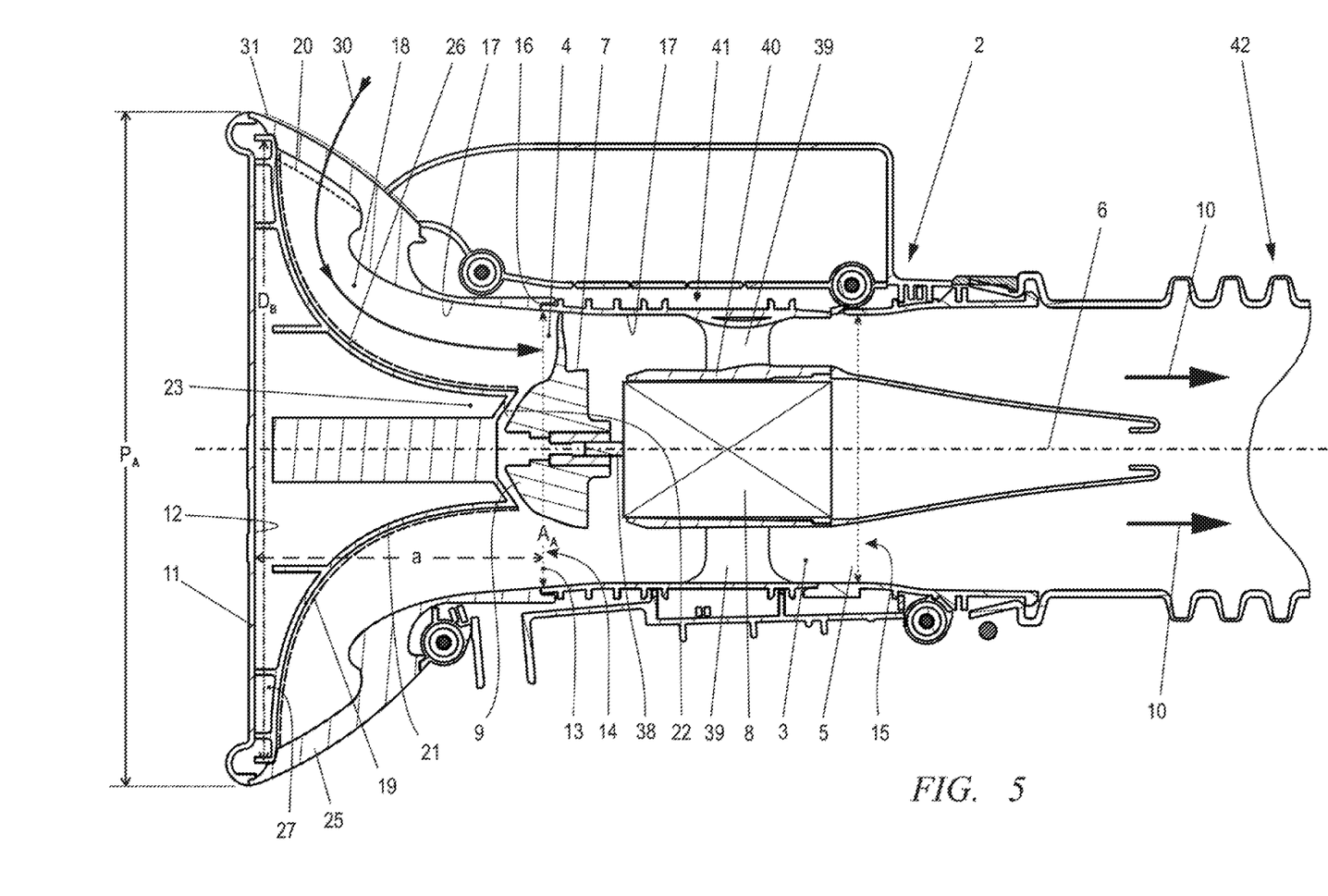
FIG. 5 shows a section through the drive unit in accordance with FIG. 4, with a sound insulating lining arranged on the air guide cone; and, FIG. 6 shows an enlarged illustration of a further view of the drive unit of the blower unit with an air guide plate arranged in front of the intake opening of the blower.

In the embodiment according to FIG. 5, the air guide cone 21 bears a sound insulating coating. Advantageously, a sound insulating lining 19 is applied to the outer surface 26 of the air guide cone 21. The sound insulating lining can be a sound insulating foam or similar material.

As FIG. 5 shows, the entire outer surface 26 of the air guide cone is provided with the sound insulating lining 19. The sound insulating lining 19 extends from the edge of the end face 22 to the edge of the base 27 of the air guide cone 21.

It is understood that the foregoing description is that of the preferred embodiments of the invention and that various changes and modifications may be made thereto without departing from the spirit and scope of the invention as defined in the appended claims.

What is claimed is:

1. A blower unit for a portable handheld blower apparatus, the blower unit comprising:
    a housing section having a tubular receiving space formed therein;
    said tubular receiving space having a first axial end and a second axial end and defining a longitudinal center axis;
    an axial blower for generating a blower air flow;
    a drive motor configured to drive said axial blower;
    said axial blower being arranged in said receiving space of said housing section;
    said axial blower having a central blower hub;
    said blower hub being aligned with the longitudinal center axis of said receiving space;
    said receiving space having an intake opening at said first axial end and a discharge opening at said second axial end;
    an air guide plate arranged at an axial distance (a) in front of said intake opening;
    said intake opening defining first external dimensions;
    said air guide plate defining second external dimensions;
    said second external dimensions being greater than said first external dimensions;
    said housing section having an outer periphery;
    said air guide plate and said outer periphery conjointly defining a gap configured to supply intake air; and,
    said air guide plate defining a solid circular surface and having a radial outer diameter.

2. The blower unit of claim 1, wherein said gap extends through a circumferential angle of up to 360° about the longitudinal center axis of said receiving space.

3. The blower unit of claim 1, wherein said intake air entering via said gap is supplied to said intake opening through a deflection angle of more than 90°.

4. The blower unit of claim 1, wherein said intake air entering via said gap is supplied to said intake opening through a deflection angle lying in a range from 90° to 180°.

5. The blower unit of claim 1, wherein said intake opening is in the form of a circular area with a first radial outer diameter ($A_A$); and, said air guide plate has a second radial outer diameter ($P_A$) that is greater than said first radial outer diameter ($A_A$) of the intake opening.

6. The blower unit of claim 1 further comprising a protective grating disposed between said air guide plate and said housing section; and, said protective grating covering said gap.

7. The blower unit of claim 6, wherein said air guide plate is held mechanically on said housing section by said protective grating.

8. The blower unit of claim 1, wherein said gap defines an air intake surface; and, said air intake surface of said gap faces said discharge opening of said receiving space.

9. The blower unit of claim 1, wherein said gap defines an air intake surface; and, said air intake surface of the gap faces said discharge opening of said receiving space and is inclined with respect to the longitudinal center axis of said receiving space.

10. The blower unit of claim 1, wherein said intake opening of said receiving space lies in a plane to which the longitudinal center axis of said receiving space is perpendicular.

11. The blower unit of claim 1, wherein said air intake opening defines a plane; and, said air guide plate is parallel to said plane of said intake opening of said receiving space.

12. A blower unit for a portable handheld blower apparatus, the blower unit comprising:
- a housing section having a tubular receiving space formed therein;
- said tubular receiving space having a first axial end and a second axial end and defining a longitudinal center axis;
- an axial blower for generating a blower air flow;
- a drive motor configured to drive said axial blower;
- said axial blower being arranged in said receiving space of said housing section;
- said axial blower having a central blower hub;
- said blower hub being aligned with the longitudinal center axis of said receiving space;
- said receiving space having an intake opening at said first axial end and a discharge opening at said second axial end;
- an air guide plate arranged at an axial distance (a) in front of said intake opening;
- said intake opening defining first external dimensions;
- said air guide plate defining second external dimensions;
- said second external dimensions being greater than said first external dimensions;
- said housing section having an outer periphery;
- said air guide plate and said outer periphery conjointly defining a gap configured to supply intake air; and,
- wherein said air guide plate has a first plate side facing said intake opening; and, said air guide plate bears an air guide cone on said first plate side.

13. The blower unit of claim 12, wherein said air guide plate and said air guide cone are formed in one piece.

14. The blower unit of claim 13, wherein said air guide plate and said air guide cone are made of plastic.

15. The blower unit of claim 12, wherein said housing section has a peripheral wall; and, said gap is configured as an air supply channel delimited by said air guide cone of said air guide plate on a first side and by said peripheral wall of said housing section on a second side.

16. The blower unit of claim 15, wherein said air supply channel is formed with a deflection angle of more than 90°.

17. The blower unit of claim 15, wherein said air supply channel is formed with a deflection angle lying in a range from 90° to 180°.

18. The blower unit of claim 12, wherein said air guide cone includes a free end section; and, said air guide cone is aligned centrally with said intake opening.

19. The blower unit of claim 18, wherein said free end section includes an end face; and, said end face of said free end section of said air guide cone is concavely curved and engages over said blower hub of said axial blower in a contact-free manner.

20. The blower unit of claim 19, wherein said end face has a maximum diameter ($D_{max}$); said blower hub has a maximum outer diameter ($N_{max}$); and, said maximum diameter ($D_{max}$) is smaller than said maximum outer diameter ($N_{max}$).

21. The blower unit of claim 12, wherein said air guide cone bears a sound insulating lining on its outer surface.

22. The blower unit of claim 21, wherein said sound insulating lining is a foam layer.

23. A blower unit for a portable handheld blower apparatus, the blower unit comprising:
- a housing section having a tubular receiving space formed therein;
- said tubular receiving space having a first axial end and a second axial end and defining a longitudinal center axis;
- an axial blower for generating a blower air flow;
- a drive motor configured to drive said axial blower;
- said axial blower being arranged in said receiving space of said housing section;
- said axial blower having a central blower hub;
- said blower hub being aligned with the longitudinal center axis of said receiving space;
- said receiving space having an intake opening at said first axial end and a discharge opening at said second axial end;
- an air guide plate arranged at an axial distance (a) in front of said intake opening;
- said intake opening defining first external dimensions;
- said air guide plate defining second external dimensions;
- said second external dimensions being greater than said first external dimensions;
- said housing section having an outer periphery;
- said air guide plate and said outer periphery conjointly defining a gap configured to supply intake air; and,
- wherein said gap is in the form of an annular gap.

* * * * *